UNITED STATES PATENT OFFICE.

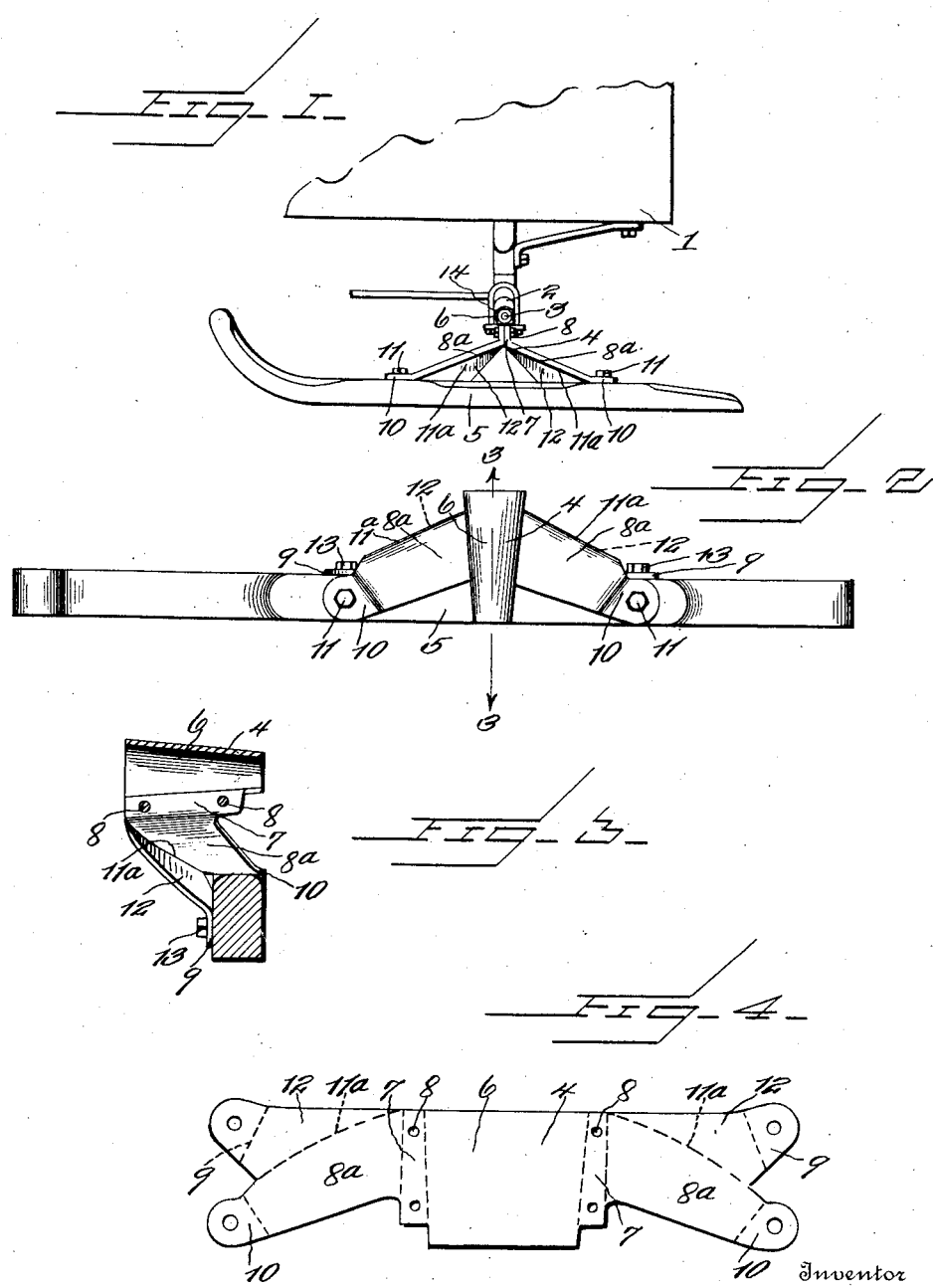

RICHARD BURBRIDGE, OF ALLISON, IOWA.

OSCILLATING BOB-KNEE FOR SLEIGH-RUNNERS.

1,348,347.

Specification of Letters Patent.

Patented Aug. 3, 1920.

Application filed March 27, 1920. Serial No. 369,304.

*To all whom it may concern:*

Be it known that I, RICHARD BURBRIDGE, a citizen of the United States, residing at Allison, in the county of Butler and State of Iowa, have invented certain new and useful Improvements in Oscillating Bob-Knees for Sleigh-Runners, of which the following is a specification, reference being had to the accompanying drawings.

This invention relates to an improved oscillating bob knee for sleigh runners and an object of the invention is to provide a device of this character made to fit on the axle of the wagon thereby allowing the use of the wagon gears when the wagon is converted into a sleigh.

Another object involves the use of an improved oscillating bob knee rigidly but detachably fixed to the runner and adapted to engage the spindle of the axle so as to oscillate, allowing the runner to accommodate itself to the irregularities of the road bed.

In some parts of the country, the law requires that sleigh runners when applied to wagons instead of wheels, must make the same size track as when the wheels are employed, hence a further aim is to provide an oscillating bob knee so fixedly carried by each runner as to maintain the runners in their proper positions, and spaced so that their tracks will correspond to those made by the wheels when in use.

While the design and construction at present illustrated and set forth is deemed preferable, it is obvious that as a result of the reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a portion of a vehicle showing the runner as applied to the spindle of the axle instead of a wheel, the runner being mounted on the spindle so as to oscillate with respect thereto, whereby the runner may accommodate itself to the irregularities of the road bed.

Fig. 2 is an enlarged perspective view of a portion of the runner and the oscillating bob knee as applied thereto, Fig. 3 is a sectional view of line 3—3 of Fig. 2, Fig. 4 is a detail plan view of the blank from which the oscillating bob knee is constructed.

Referring to the drawings, 1 designates a portion of the body of a vehicle, which is mounted upon the axle 2 provided with a spindle 3. An oscillating bob knee 4 is mounted upon the spindle 3, and is in turn connected to a runner 5. The bob knee 4 is constructed from a single piece of heavy sheet metal rolled upon itself at a point midway its ends to form the bearing sleeve 6. This sleeve 6 is conical corresponding to the spindle 3 so as to properly engage the same. Parts 7 of the sheet metal beyond the sleeve are riveted or bolted together as shown at 8, thereby constructing the sleeve rigid. The parts 8$^a$ of the sheet metal beyond the portion 7 are bent downwardly and in diverging directions thereby providing supports for the axle and the vehicle. These supports or parts 8$^a$ at their lower ends are provided with forks 9 and 10. The forks 10 are bolted or otherwise secured at 11 to the upper edge of the runner 5. The supports or parts 8 of the oscillating knee are bent upon themselves as indicated at 11$^a$, and in a direction from the crotch between the forks 9 and 10 thereby providing the downwardly and outwardly extending flanges 12, which merge into the forks 9. These flanges 12 act to reinforce the supports or parts 8$^a$. The forks 9 are bent slightly from the downwardly extending flanges or braces 12 and are secured at 13 to the inner face of the sides of the runner. By means of these forks 9 and 10 and the reinforcing flanges 12 the supports or parts 8$^a$ of the oscillating bob knee are relatively braced, in fact the entire oscillating bob knee is relatively reinforced with respect to the runner.

It will be noted that the sleeve of the bob knee corresponds to and engages the spindle of the axle, and the nut 14 which retains the wheel on the vehicle is adapted to be applied to the extremity of the spindle to hold the sleeve in position. As will be understood this oscillating bob knee is constructed from a single sheet of heavy sheet metal and furthermore this oscillating bob knee can be constructed by a single operation of stamping, or by a single operation of a drop forge method, whereby the metal is cut according to the shape required and bent to form the sleeve and downwardly and diverging supports or parts 8ª terminating with the forks. In the use of this device, it will be observed that it can be easily applied to the spindle instead of the usual wheel and the retaining nut 14 which as a rule retains the wheel on the spindle is applied to the spindle to retain the sleeve in position. By this arrangement and construction of oscillating bob knee it is to be noted that the runner is adapted to accommodate other irregularities of the road bed. In fact, the runner will oscillate to ride over upwardly inclined portions of the road bed, and down inclined portions, thereby readily relieving the jar upon the body of the vehicle, and enabling the vehicle to ride smoothly, and without any inconvenience.

The invention having been set forth, what is claimed as new and useful is:

1. As a new article of manufacture, an oscillating bob knee constructed from a single piece of sheet metal rolled upon itself to form a conical sleeve for the reception of and engagement with the spindle of a vehicle axle, means for securing the opposing parts of the bob knee together at a point adjacent the sleeve, thereby reinforcing the sleeve, the other parts of the bob knee extending downwardly and diverging and forming supports, said supports being bent upon themselves to form right angle parts for reinforcing the knee, the terminals of the supports and the right angle parts terminating in forks, adapted to be secured to the upper edge and the sides of a runner.

2. In a device as set forth, the combination with a vehicle axle having a spindle, of a sleigh runner, an oscillatory bob knee constructed from a single piece of sheet metal bent upon itself substantially intermediate its ends to form a sleeve engaging the spindle of the axle, the parts of the single piece of sheet metal immediately beyond the sleeve being secured together at a point under the sleeve, said parts of the sheet metal beyond the securing means below the sleeve converging downwardly and outwardly and laterally and terminating in ears secured to the runner, said diverging parts of the sheet metal bob knee having downwardly extending right angle flanges tapering from a point where said parts of the sheet metal bob knee are secured together and terminating in ears, and means securing said last mentioned ears to the inner side of the runner, said downwardly right angle extending flanges constituting means to reinforce the diverging parts of the sheet metal bob knee and prevent collapsing of the knee downwardly toward the runner.

In testimony whereof I hereunto affix my signature.

RICHARD BURBRIDGE.